Patented July 21, 1942

2,290,206

UNITED STATES PATENT OFFICE 2,290,206

PROCESS OF METAL RECOVERY

Stephen C. Pool, Rochester, N. Y., assignor to Eastman Kodak Company, Rochester, N. Y., a corporation of New Jersey No Drawing. Application April 18, 1941, Serial No. 389,223

14 Claims. (Cl. 75—118)

This invention relates to improvements in processes for the recovery of metals. More particularly this invention relates to new procedure in processes for recovering metals, such as silver, from the deposits of sludge or slurry obtained in precipitation or coagulation methods of recovering the metals from waste liquids.

The recovery of valuable metals from sources thereof containing the metals in relatively small quantities is described in prior patents, as for example, Folwell Patent 2,196,764, patented April 9, 1940. As there indicated, one source of such metals is waste photographic solutions. When the term "solution" is employed herein it embraces not only instances where the metals may be in soluble form, but other instances where, for example, the metal either as such or as a metal salt might be in the form of a suspension, or other analogous conditions resulting from reaction or displacement.

The materials in liquid form from which the metals are to be recovered are treated with a precipitating or coagulating agent which causes the metal to deposit from the supernatant liquid as a slurry or sludge. These deposited substances contain in addition to the metallic components being recovered, components which serve as a source of regenerating the treating agent. These deposited substances are therefore further treated with a chemical such as caustic soda for regenerating a material which may be used in the aforementioned precipitating or coagulating step. It has been found, however, in extensive operation, where the agent employed in the precipitating step is regenerated a number of times and re-utilized, that certain discolorations may be evidenced in the regenerated materials. Also, the efficiency of the regenerated materials may become impaired to some extent which either may necessitate an increase in the quantity of the dosages of the agents or may indicate itself by failure to get the desired precipitation or coagulation, and consequent losses of the metal.

I have found a procedure whereby the aforementioned difficulties may be eradicated or minimized, which procedure is relatively simple and economical.

This invention has for one object to provide an improved method for metal recovery from sources containing the metal in relatively small quantities. Still another object is to provide improved procedure for the recovery of metals in types of processes wherein the metals have been deposited as or in a sludge or slurry. Still another object is to provide procedure in metal recovery processes wherein certain reagents used in precipitating or coagulating the metals are regenerated and wherein the number of regeneration cycles and the quality of the agents regenerated are improved. A still further and particular object of this invention is to provide improvement in processes for the recovery of silver and halogens, as for example, bromine and iodine, from waste photographic solutions by procedure including the steps of causing silver halides and silver to be deposited and the deposited materials further treated to recover valuable components therefrom. A still further object is to provide an improved procedure for operating continuous silver recovery processes. Other objects will appear hereinafter.

While I do not wish to be limited to any particular theory of operation respecting the functioning of my process, I set forth hereinafter details which I believe may represent the mechanism of the reaction involved. I have found that the metal-containing solutions, as for example, the aqueous liquids from photographic processes from which silver is to be recovered, may also contain organic matter. Some of this organic matter is proteinaceous, as for example would be exemplified by gelatin. This organic matter is carried along with the silver and the coagulating agent. That is, when the metal is caused to be deposited by using aluminum salts or other medium or reagent in the process this deposit not only comprises the silver or other metal, but may also have carried along with it some of the undesirable organic matter which was present in the initial liquid along with the silver. When the precipitate or slurry is treated with a reagent, as will be described in detail hereinafter, as for example caustic soda, to regenerate the compound which may be recycled or reused in the precipitating or coagulating step, it has been found that the regenerated materials may tend to darken and otherwise become unsatisfactory upon continued regeneration or recycling. This darkening of the regenerated aluminum salts (or other regenerated reagent) may reduce their efficiency and require that larger quantities be employed, or the use of such regenerated salts, after a certain period of time, may incur metal losses due to their reduced efficiency. I have found, however, that the foregoing deterioration in the regenerated treating agents may be eliminated or minimized to a substantial extent by preferably adding to the aforementioned precipitate or slurry certain chemical compounds, usually in conjunction with the chemical compound added for causing the regeneration of the treating salts. Lime is one of the chemical materials which may be employed carrying out my invention, and is quite satisfactory inasmuch as it is readily available commercially and is relatively economical. In processes of this type, where the quantity of metal being recovered is quite small, it is readily apparent that the cost of the materials employed and the expense of an added step is a factor which requires careful consideration.

A further understanding of my invention will be had by a consideration of the following examples which illustrate a specific application of my invention to certain types of silver recovery processes. It is to be understood, however, that these examples are set forth primarily for illustrating a preferred embodiment of my invention and, hence, are not to be considered an undue limitation upon my invention.

*Example I*

In accordance with this example several thousand gallons of waste photographic solutions were treated for silver recovery by adding sodium aluminate and certain other components to the waste water in accordance with the procedure set forth in the aforementioned Patent 2,196,764. The sodium aluminate was substantially neutralized and the sludge carried down by the resultant floc formed was permitted to settle out. The resultant sludge or slurry was concentrated further by heating and settling so that there were approximately 850 gallons of sludge, as contrasted to the original several thousand gallons of the waste solution. The principal ingredients of this sludge, besides water, were silver halide, metallic silver, and aluminum hydroxide. This sludge, however, contained some organic proteinaceous matter, presumably derived from gelatin initially present in the photographic materials and which organic matter, as aforedescribed, would cause the aforesaid disadvantages of darkening of the regenerated materials and other difficulties.

This 850-gallon batch of slurry was then heated with steam to a temperature between 150° F. and 200° F. Then there was added thereto between 30 to 60 pounds of flake caustic soda and a quantity of slaked lime amounting to 15%-30% by weight of the caustic soda addition. During these additions agitation or other procedure is ordinarily employed for satisfactorily incorporating the additions with the slurry which is being treated.

Upon cooling and settling the regenerated sodium aluminate treating salts which would be recycled to the first step of the process, was found to be a yellow-colored solution with a pH of about 12. It contained approximately 0.155% aluminum or the equivalent of 1.92% hydrated aluminum sulfate, $Al_2(SO_4)_3 ; 18H_2O$.

Such regenerated aluminate, in accordance with my process, is superior to aluminate recovered with, for example, caustic soda alone. The aluminate recovered in accordance with my process is a very excellent coagulating agent for reutilization in the recovery of silver components from colloidal suspension in water. The treating salts recovered, in accordance with my invention, may be reutilized many times with satisfactory results and without the aforementioned darkening or loss of efficiency as may be experienced with the treating salts not recovered in accordance with my invention.

*Example II*

This example illustrates the manner in which waste photographic emulsions may be satisfactorily treated for recovery of silver in the same process in which sodium aluminate is regenerated and recycled, and sludges containing silver are concentrated for smelting, thereby effecting a considerable saving in the handling of the waste emulsions. Since waste photographic emulsions are ordinarily very rich in proteinaceous material (e. g., gelatin), it is evident that they could not be added to a slurry from which aluminate would be recovered with caustic alkali alone, even in relatively small proportion, without interfering with the quality of the recovered aluminate solution for the reasons already set forth. However, the cost of separate treatment of waste emulsions to recover the silver and other valuable materials contained therein is substantial, hence, there is a great advantage in a procedure of treating them in combination with the kind of slurry ordinarily obtained by coagulating the suspended solids in waste photographic solutions by precipitation of aluminum hydroxide (or other amphoteric precipitant) therein.

In accordance with this example slurries containing, besides water, silver halides, metallic silver, aluminum hydroxide, and organic matter, similar to the 850-gallon batch of slurry of Example I, are blended with waste emulsion and treated with caustic alkali and lime, as follows:

Approximately 1850 gallons of slurry and 150 gallons of waste photographic emulsion are blended with approximately 200 gallons of caustic liquor from a third stage treatment of sludge previously prepared in accordance with this example, this sludge having been heated in the third step to 150° F. to 200° F., with 20 to 80 pounds of flake caustic soda, in order to further concentrate the sludge before settling and centrifuging out approximately 200 gallons of caustic liquor in order to produce a concentrated sludge.

The mixture of slurry, waste emulsion, and caustic liquor is then heated with steam to a temperature between 150° F. and 200° F. Then there are added thereto 120 to 180 pounds of flake caustic soda and 30 to 40 pounds of slaked lime. The lime is usually mixed with water and added first, and then the caustic soda is dissolved in water and added. During these additions, agitation or other procedure is employed for satisfactorily incorporating the additions with the slurry and emulsion which are being treated.

Upon cooling and settling, there is obtained a regenerated sodium aluminate solution, ready to be recycled to the first step of the process, which is superior to aluminate recovered with, for example, caustic soda alone. Even though waste emulsion rich in gelatin is added to the slurry before heating with lime and caustic alkali, there is practically no loss in efficiency of regenerated sodium aluminate solution. When waste photographic solutions are treated in accordance with my process, losses of silver may be 25 to 50 per cent lower than they would be if lime or a similar alkaline earth metal compound were omitted.

It can be seen from the foregoing examples that my improved procedure for regenerating treating salts enables the obtaining of a much better product operating under industrial conditions. There is also the evidence of other advantages such as, for example, that the silver-containing sludge prepared by my process contains less components such as sulfur and the like. This might be due to the fact that sulfur along with the silver in the sludge is derived from organic compounds such as gelatin, and sulfuric acid used in neutralizing the sodium aluminate in the precipitating step, if lime is omitted from the aluminate recovery step. The reduction in sulfur content aids in the subsequent treatment of the silver sludge obtainable in accordance with my process by fusion to recover poured bar-silver therefrom.

In carrying out my process, while as indicated, I prefer to use slaked lime or quicklime, due to its availability and relatively low cost, there are other materials which would function satisfactorily and which might be employed in my process. For instance, calcium chloride or barium salts (baryta) might be used in place of or in conjunction with the lime. Likewise, while I have described my process for use particularly in or for the recovery of silver, analogous procedure may be applied to the recovery of other valuable metals from flocculated sludges wherein there may be the presence of organic materials tending to degrade the resultant regenerated materials unless such deterioration was eliminated by the addition of lime or other reagent in accordance with my process. It is likewise to be pointed out that the proportion of slaked lime or other agent to the caustic soda might be more or less than 1:5 or 3:10 as described in the first example. The temperature to which the mixture is heated may vary, as for example, between 140° F. and 212° F. Or in my process the lime treatment, or treatment with other reagent might be carried out upon regenerated sodium aluminate prepared with caustic soda or caustic potash alone. The caustic soda or caustic potash addition may be partially or completely replaced by reagents such as soda ash, potash, lithium salts, water glass, or the like.

There are various other process features which my invention embraces. Although I have described the operation of my process as applied particularly to the treatment of sludges or slurries resulting from precipitation by means of aluminum salts, various other amphoteric reagents may be employed either alone or in conjunction with the aluminum salts. Certain of these other reagents are referred to in Patent 2,196,764 aforementioned. Or, for example, compounds of silicon, exemplified by potassium silicate, or zincates, may be used advantageously in combination with aluminum compounds. Or instead of employing amphoteric metal salts for the coagulating or flocculating step I may employ coagulating or flocculating mediums resulting from the use of lignin solutions and/or concentrate. These lignin materials are commercially obtainable as alkaline black liquors from the soda or sulphate (kraft) process of manufacturing wood pulp or comparable procedure. In the event of the use of any of these other precipitating or flocculating agents and the recovery of materials for reuse from the resultant sludge or slurries, I may likewise advantageously embrace the use of lime or other alkaline earth addition, as described in the preceding examples. That is, at some point before the recovered medium would be reused or recirculated to the precipitation step, the recovered medium would be treated with at least one soluble or partially soluble alkaline earth compound which would act upon any of the detrimental organic components therewith in strongly alkaline solution.

My invention also embraces the instances wherein, in addition to the treatment of the sludge with sodium hydroxide, lime or the like additional components might be added to fortify the medium being recovered. That is, in the recovery of sodium aluminate, as aforesaid, in addition to adding caustic soda and lime I might also add one or more of the components aluminum sulphate, aluminum hydrate or even new sodium aluminate.

Although I refer to the materials from which the silver or other metal is to be recovered as being solutions, it is understood that by this term I intend to embrace various aqueous dispersions of metals, as for example, instances where the metal as such, or as in soluble salts, may be in colloidal suspension. Or my process contemplates instances where the metal might be initially in a soluble form but during the progress of the process the silver, by reaction with a halide (chloride ion) or other reagent may be converted into a substantially insoluble material. While I have referred to the use of caustic soda, other reagents such as caustic potash or the others discussed above, either alone or mixed with the caustic soda, may be employed. Likewise when I refer to the use of lime or barium salts it is to be understood that I contemplate the employment of various alkaline or alkaline earth salts or oxides, or other derivatives thereof, which will precipitate or otherwise destroy the organic materials in a manner analogous to the effect of lime, as above described.

In general, as I have described, it is preferred to employ one soluble or partially soluble alkaline earth compound which will act upon said organic component or components in strongly alkaline solution.

Therefore, it is apparent from the foregoing that my invention is susceptible to some modification, hence, I do not wish to be restricted excepting insofar as is necessitated by the prior art and the spirit of the appended claims.

What I claim and desire to be secured by Letters Patent of the United States is:

1. A process for the recovery of silver components from aqueous liquids from photographic processes which comprises causing the deposition of silver components in a sludge by adding to the aqueous liquid coagulating materials containing as essential ingredients sodium aluminate and an inorganic acid, heating the resultant sludge which contains as principal ingredients water and certain organic compounds, silver halides, metallic silver, and aluminum hydroxide, at a temperature between 150° F. and 200° F., settling the heated sludge and thoroughly incorporating therewith caustic soda and slaked lime, the amount of the lime being 20%–30% of the weight of the caustic soda, cooling the resultant mixture and settling and recovering therefrom regenerated sodium aluminate of improved quality.

2. A process for the recovery of metal components from aqueous liquids from photographic processes which comprises causing the deposition of metal components in a sludge by adding to the aqueous liquid, coagulating mediums containing as an essential ingredient sodium aluminate and a neutralizing agent, steam heating the resultant sludge which contains water, silver halides, metallic silver, aluminum hydroxide, and certain organic compounds, thoroughly incorporating with the heated sludge caustic soda and slaked lime, and recovering therefrom regenerated sodium aluminate of improved quality.

3. A process for the recovery of silver components from aqueous liquids which comprises causing the deposition of silver components in a sludge by treating the aqueous liquid with coagulating medium, heating the resultant sludge which contains water, silver component, materials resulting from said coagulating medium, and organic compounds, incorporating with the heated deposit an alkali hydroxide and at least one calcium compound which will act upon said organic components, the amount of the calcium compound being 10%–35% of the weight of the alkali hydroxide and recovering therefrom regenerated coagulating materials of improved quality.

4. A process for the recovery of silver components from waste liquids from photographic processes which comprises causing the deposition of the silver components as a sludge by adding to the liquid materials containing aluminum salts, treating the resultant sludge which contains water, silver halides, metallic silver, aluminum salts and certain organic compounds, with caustic alkali to act upon the aluminum salts, and lime to act upon the organic materials, the amount of the lime being only a fraction of the weight of the caustic alkali, and recovering regenerated aluminum salts of improved quality.

5. A process for the recovery of metal components having a silver content from photographic liquids which comprises causing the deposition of the metal component in a sludge by adding to the liquid coagulating medium, heating the resultant sludge which contains water, metal component, coagulating materials, and proteinaceous organic compounds, thoroughly incorporating with the heated materials metal compounds of metals from the group consisting of alkali and alkaline earth metals, cooling the resultant mixture, settling and recovering therefrom regenerated coagulating materials of improved quality.

6. In a process for the recovery of metals from photographic liquids containing the metals by steps including causing the metallic compounds to be precipitated in a sludge and further concentrating the sludge together with regeneration of materials which may be recycled to the precipitating step, the improvement steps which comprise treating the sludge with a mixture of caustic soda together with at least one other component from the group consisting of calcium and barium compounds capable of decomposing gelatinous materials, said treatment taking place in the presence of heating and with thorough incorporation of the addition agents with the sludge whereby an improved quality material may be reutilized in the process is regenerated.

7. In a process for the recovery of silver components from waste photographic liquids containing the same by steps including causing the silver components to be deposited as a sludge together with valuable bromine and iodine compounds, and further concentrating the sludge together with regeneration of treating materials which may be recycled to the precipitation step of forming said sludge, the improvement step which comprises regenerating said treating agent by procedure utilizing addition agents, not only of caustic alkali but at least another component from the group consisting of calcium and barium compounds which will decompose gelatinous materials, said regeneration taking place in the presence of heating and with thorough incorporation of the addition agents, whereby an improved quality treating material which may be reutilized in the process is regenerated.

8. In a process for the recovery of metals from liquids containing the metals by steps including causing the metallic compounds to be deposited as a sludge by the addition of treating materials to the liquid and further concentrating the sludge together with regeneration of said treating materials which may be recycled to the precipitating step, the improvement steps which comprise regenerating said treating materials by the use of addition agents of caustic alkali and at least one other component from the group consisting of calcium and barium compounds which will decompose gelatinous materials, said treatments taking place in the presence of heating and with thorough incorporation of the addition agents whereby an improved quality material which may be reutilized in the process is regenerated.

9. In a process for the recovery of silver components from liquids containing the same by steps including causing silver components to be deposited as a sludge by the addition of treating materials to the liquid and further concentrating the sludge together with regeneration of said treating materials which may be recycled to the precipitating step, the improvement steps which comprise regenerating said treating materials by the use of addition agents of caustic soda and one other component from the group consisting of calcium and barium compounds which will decompose gelatinous materials, said treatment taking place in the presence of heating with thorough incorporation of the addition agents whereby an improved quality material which may be reutilized in the process is regenerated.

10. A process for the recovery of metal components having a substantial content of silver from liquids containing the same, which comprises causing the deposit of the metal components in a sludge by incorporating in the liquid a medium comprising an amphoteric salt which produces a floc that carries the metal component out of liquid suspension to form said sludge, treating the resultant sludge which in addition to the metal component may include undesirable components detrimental to the amphoteric salt, with reagents to regenerate said amphoteric salts reusable in the aforesaid deposition step, said treatment being characterized in that it includes therein the step of subjecting the amphoteric salts prior to their reuse, with at least one partially soluble alkaline earth compound which will act upon said undesirable components in strongly alkaline solution.

11. A process for the recovery of metal components having a substantial content of silver from liquids containing the same, which comprises causing the deposit of the metal components in a sludge by incorporating in the liquid a medium comprising alkaline black liquors which produce a floc that carries the metal component out of liquid suspension to form said sludge, treating the resultant sludge which in addition to the metal component may include undesirable organic components detrimental to the alkaline black liquors, with reagents to regenerate said alkaline black liquors reusable in the aforesaid deposition step, said treatment being characterized in that it includes therein the step of subjecting the floc materials from said alkaline black liquors prior to their reuse, with at least one partially soluble alkaline earth compound which will act upon said undesirable components in strongly alkaline solution.

12. A process for the recovery of metal components such as silver, gold, platinum, nickel, copper, cadmium, and mercury from liquids containing the same, which comprises causing the deposit of the metal components in a sludge by incorporating in the liquid a medium comprising a filocculating material which produces a floc that carries the metal component out of liquid suspension to form said sludge, treating the resultant sludge, which in addition ot the metal component may include undesirable components detrimental to the flocculating medium, with reagents to regenerate flocculating materials reusable in the aforesaid deposition step, said treatment being characteristized in that it includes therein the step of subjecting the flocculating materials prior to their resuse, with at least one partially soluble calcium compound which will act upon said undesirable components in strongly alkaline solution.

13. A process for the recovery of metal components from liquids containing the same, which comprises causing the deposit of the metal components in a sludge by incorporating in the liquid a medium comprising a flocculating material which produces a floc that carries the metal component out of liquid suspension to form said sludge, treating the resultant sludge, which in addition to the metal component may include undesirable components detrimental to the flocculating medium, with reagents to regenerate flocculating materials reusable in the aforesaid deposition step, said treatment being characterized in that it includes therein the step of subjecting the flocculating materials prior to its reuse, with at least one barium compound, which will act upon said undesirable components in strongly alkaline solution.

14. The process which comprises treating liquid from photographic processes containing metallic components which it is desired to recover with materials which cause the metallic components to be deposited in the form of a sludge, incorporating with this sludge waste having a content therein of the metal being recovered, this metal, however, being in the presence of detrimental proteinaceous compounds, recovering materials which may be employed in the aforesaid step of forming the sludge, said recovery step being characterized in that it includes the contacting of the recovered materials prior to their reuse in the formation of further sludge, with at least one soluble alkaline earth compound which is soluble to some extent under the reaction conditions and which will act upon said detrimental compound in strongly alkaline solution.

STEPHEN C. POOL.